United States Patent [19]

Rote et al.

[11] Patent Number: 5,275,112

[45] Date of Patent: Jan. 4, 1994

[54] INTEGRATED NULL-FLUX SUSPENSION & MULTIPHASE PROPULSION SYSTEM FOR MAGNETICALLY-LEVITATED VEHICLES

[75] Inventors: Donald M. Rote, Lagrange; Jianliang He, Woodridge; Larry R. Johnson, Naperville, all of Ill.

[73] Assignee: The United States of America as represented by the United States Department of Energy, Washington, D.C.

[21] Appl. No.: 952,247

[22] Filed: Sep. 28, 1992

[51] Int. Cl.⁵ .............................................. B60L 13/00
[52] U.S. Cl. .................................................. 104/282
[58] Field of Search .......................... 104/281, 282, 286

[56] References Cited

U.S. PATENT DOCUMENTS

| | | | |
|---|---|---|---|
| 4,131,811 | 12/1978 | Apsit et al. | 104/282 |
| 4,299,173 | 11/1981 | Arima et al. | 104/282 |
| 4,779,538 | 10/1988 | Fujiwara et al. | 104/282 |

FOREIGN PATENT DOCUMENTS

| | | | |
|---|---|---|---|
| 2610538 | 9/1977 | Fed. Rep. of Germany | 104/281 |
| 3743101 | 7/1988 | Fed. Rep. of Germany | 104/281 |
| 0167606 | 7/1988 | Japan | 104/281 |
| 0107603 | 4/1989 | Japan | 104/282 |
| 0298902 | 12/1989 | Japan | 104/282 |
| 0017806 | 1/1990 | Japan | 104/281 |
| 0101904 | 4/1990 | Japan | 104/281 |

OTHER PUBLICATIONS

H. T. Coffey et al. "Preliminary Design for a Maglev Development Facility".

*Primary Examiner*—Mark T. Le
*Attorney, Agent, or Firm*—Bradley W. Smith; Robert J. Fisher; William R. Moser

[57] ABSTRACT

A propulsion and stabilization system comprising a series of FIG. 8 coils mounted vertically on the walls of the guideway to provide suspension, lateral guidance and propulsion of a magnetically levitated vehicle. This system further allows for altering the magnetic field effects by changing the relative position of the loops comprising the FIG. 8 coils either longitudinally and/or vertically with resulting changes in the propulsion, the vertical stability, and the suspension.

11 Claims, 4 Drawing Sheets

INTEGRATED NULL-FLUX SUSPENSION & MULTIPHASE PROPULSION SYSTEM FOR MAGNETICALLY-LEVITATED VEHICLES

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to magnetically levitated vehicle (maglev) and propulsion systems and more particularly to maglev systems in which "FIG. 8" coils or windings are mounted on vertical walls to provide suspension, lateral guidance, and propulsion for the vehicle. The invention further includes changes in the coil patterns to provide propulsion when the vehicle coil is symmetrically placed about the horizontal midplane of the "FIG. 8" coil. In addition, the invention provides for changing the spacing between the upper and lower coil whereby increasing the spacing between the upper and lower loops of the "FIG. 8" coil provides one with the capability to partially control the stable range of vertical suspension and to partially control the vehicle suspension stiffness.

Maglev development began more than two decades ago in the United States, Germany, Japan, Canada and England. In the United States, renewed interest has been directed toward magnetic levitation transportation systems in view of such factors as energy conservation, high speed transportation at ground level, economic and environmental problems associated with conventional systems, and competition from West Germany, and Japan.

The use of an electrodynamic suspension to provide levitation in maglev systems is well known in the prior art (see further, U.S. Pat. No. 3,470,828, issued Oct. 7, 1969, to Powell et al). A number of methods of using magnetic forces to suspend, guide, and propel vehicles have been described in the literature. There are two basic suspension concepts that are based on the use of magnetic forces. One called the Electromagnetic System (EMS) utilizes the attractive force between controlled d.c. electromagnets and ferromagnetic rails while the other called the Electrodynamic System (EDS) utilizes the repulsive force between eddy currents induced in non-ferromagnetic metal conductors and superconducting magnets (SCM's) operating in the persistent current mode and moving relative to the conductors. Generally, the SCM's or the electromagnets are mounted on the lower part of the vehicle, while the iron rails or non-ferromagnetic metal conductors are mounted on the fixed guideway. The propulsion system most frequently used for either the EMS or EDS suspension is the linear synchronous motor (LSM). The LSM consists of windings placed on the guideway that are energized by an external source of three phase or multiphase power. The 3-phase or, in the alternative, multiphase excitation of the windings produces a traveling magnetic wave that interacts with the onboard magnets and moves the vehicle along the guideway at a synchronous speed, a speed equal to that of the traveling magnetic wave.

The repulsive levitation, suspension, force is generated by the interaction between a rapidly changing magnetic field generated by superconducting magnets aboard the moving vehicle and eddy currents induced in the guideway conductor. The guideway conductor can be made of a continuous sheet of a non-magnetic conductor, such as aluminum, or of discrete coils, loops or slotted hollow tubular type structures of similar material.

A special suspension concept that is based on the EDS is called "null-flux" suspension. It was invented by J. Powell and G. Danby in the late sixties and patented in 1969, see U.S. Pat. No. 3,470,828, as referred to above. The concept was invented as a way to reduce the electromagnetic drag force that is inherent in any suspension system that relies on eddy currents in the conductors. The concept also results in a stiffer suspension system than non-null-flux approaches. The heart of the null-flux system is a series of shorted "FIG.-8" coils. The "FIG.-8" coils may be vertically oriented on the guideway or folded over so that the upper and lower loops of the "FIG.-8" are parallel to each other. When an energized coil, for example an SCM, passes midway between the loops, no net current is induced in the loops because they are cross connected or counter wound hence the term "null-flux". When the SCM is displaced from the midplane or neutral position relative to the upper and lower loops, a large net current is induced in the loops and a strong repulsive force acts to restore the SCM to the neutral or "null-flux" position. Some maglev design concepts utilize the same vehicle magnets to perform more than one of the basic functions, suspension, guidance, or propulsion. This multiple tasking occurs when the vehicle magnets interact with suitable guideway mounted devices. Some additional concepts, as described in the literature, also include multi-use guideway-mounted coils. For example, the Japanese "Linear Motor Car" developed at the Japanese Railway Technical Research Institute and currently being tested at the Miyazaki Test Track applies externally excited three phase power to a set of vertically-mounted guideway coils for lateral guidance and for propulsion of the vehicle. A Canadian conceptual design also uses such a set of dual purpose, guidance and propulsion, coils mounted on the guideway. In both designs, a separate set of guideway-mounted coils is used for suspension. In addition, both concepts require that the propulsion and guidance coils mounted on opposite vertical walls must be cross-connected to provide lateral, null-flux guidance.

In the invention described herein, the vehicle-borne magnets interact with a single set of coils mounted on vertical guideway walls to produce a form of "null-flux" suspension, lateral guidance, and when the guideway mounted coils are excited with multi-phase power from an external source, propulsion as well. The lateral guidance is not of the "null-flux" type and does not require cross-connecting of coils mounted on opposite sides of the walls of the guideway. The lateral guidance forces arise naturally in this invention because of the interaction of the field from the vehicle-borne SCM's with the eddy currents induced in the "FIG.-8" coils producing both a vertical force component for the suspension, and a force normal, horizontal, to the coil plane for lateral guidance.

It is an object of this invention to employ a "FIG. 8" coil system attached to the guideway to provide suspension and lateral guidance to a SCM equipped vehicle.

It is a further object of this invention to longitudinally offset one loop of the "FIG. 8" coil from the other loop to provide propulsion as well as suspension and lateral guidance to a SCM equipped vehicle.

Another object of this invention provides for altering the spacing between the loops of the "FIG. 8" coil to partially control the vertical stability range and the vertical suspension stiffness.

Additional advantages, objects and novel features of the invention will become apparent to those skilled in the art upon examination of the following and by practice of the invention.

SUMMARY OF THE INVENTION

To achieve the foregoing and other advantages, this invention comprises a series of "FIG. 8" coils mounted vertically on the walls of the guideway to provide suspension, lateral guidance and propulsion of a magnetically levitated vehicle. This system further allows for altering the magnetic field effects by changing the relative position of the loops comprising the FIG. 8 coils either longitudinally and/or vertically or by changing their relative size to produce changes in the propulsion, the vertical stability, and the suspension.

BRIEF DESCRIPTION OF THE DRAWINGS

The present invention is illustrated in the accompanying drawings where.

DETAILED DESCRIPTION OF THE INVENTION

Figure 1:
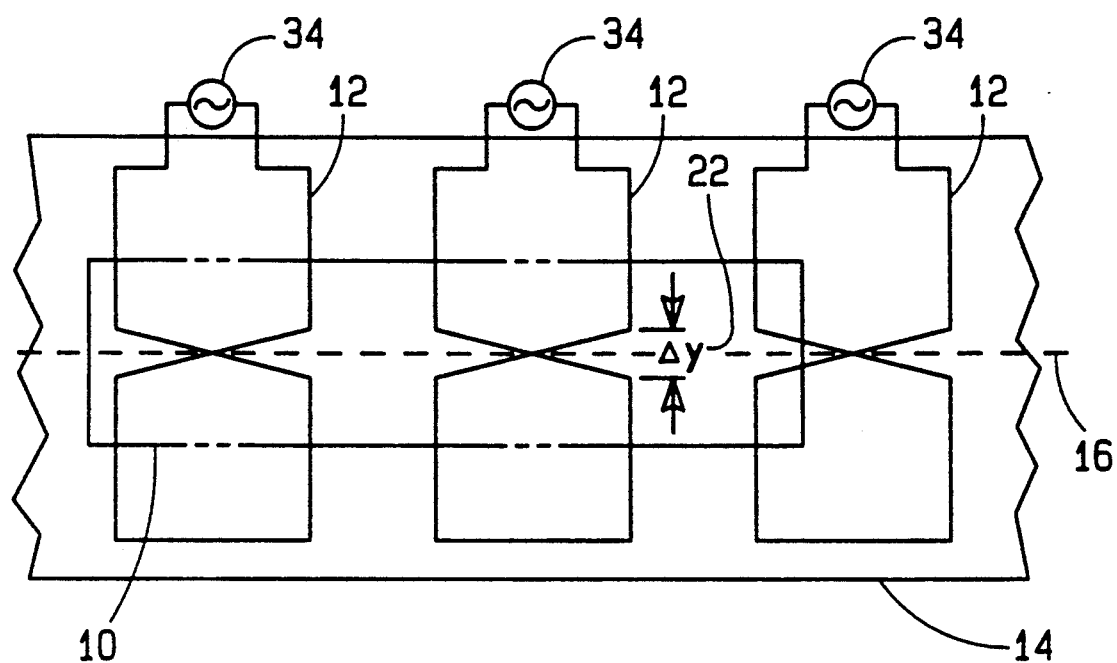
FIG. 1 is a schematic showing the "FIG. 8" coil centered about the "FIG. 8" midplane and illustrating only one "FIG. 8" per phase for a 3-phase system.
Figure 2:
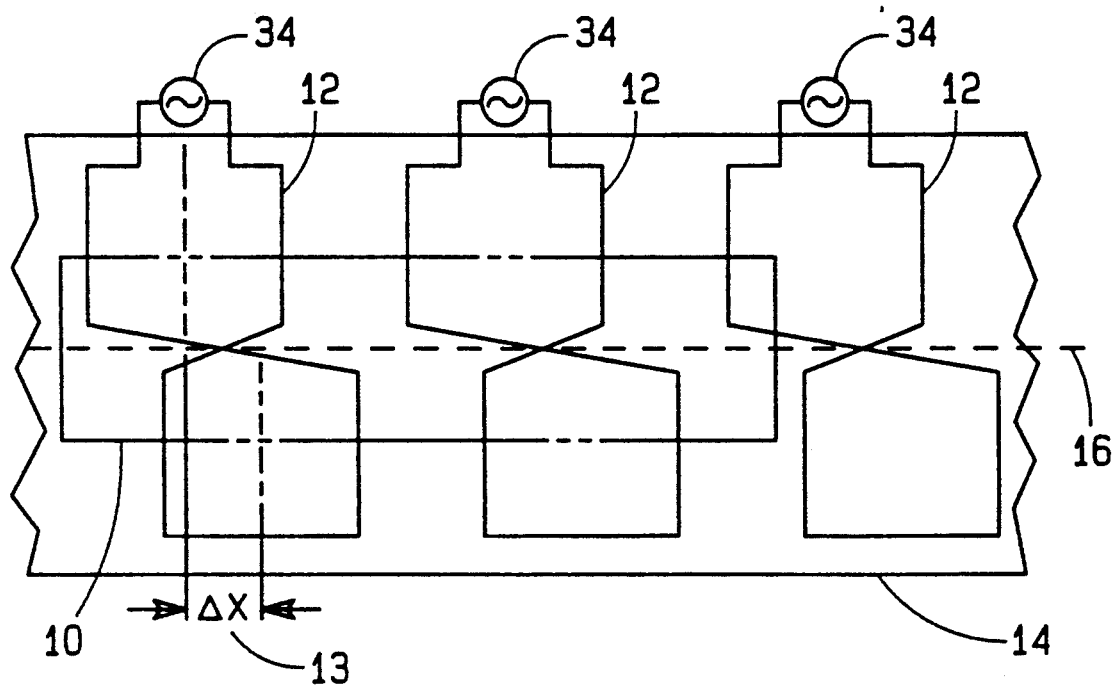
FIG. 2 illustrates a section of guideway wall with vertically mounted "FIG. 8" coils where the lower loop of each coil experiences a $\Delta x$ longitudinal offset.

FIG. 1 depicts the vehicle or superconducting magnet coil 10 operating in a persistent current mode and mounted vertically on both sides of the vehicle body. Sets of multi-phase windings or coils 12 are mounted vertically on the walls of a fixed guideway structure 14. Although only one winding is shown, the general configuration would call for multiple windings. Each coil 12 has a "FIG. 8" appearance with the upper and lower loops or coils wound in the opposite directions. Three types of "FIG. 8" coil arrangements are envisioned, FIGS. 1, 2, and 3 respectively. In FIG. 1 the upper and lower loops of the "FIG. 8" coil 12 are identical and are symmetrically placed about the horizontal midplane or neutral plane 16. In FIG. 2, the upper and lower loops are longitudinally displaced relative to each other. Null-flux suspension, as described earlier, uses the type of "FIG. 8" coil arrangement as shown in FIG. 1. However, when used for both suspension and guidance, this type of symmetrical "FIG. 8" configuration leads to a zero thrust condition, no propulsion, when the vehicle coil 10 is also symmetrical about the horizontal midplane 16 of the "FIG. 8" coil. This zero thrust condition can be changed to a non-zero thrust condition by longitudinally offsetting the upper and lower loops of the "FIG. 8" coils as shown in FIG. 2. This change in thrust condition is due to the phase relationship between the magnetic induction vectors for the two loops comprising the FIG. 8 coil. When the upper and lower loops are of the same size and are symmetrically oriented with respect to the vehicle coil, one vertically aligned with the other and with the current flowing in opposite directions, due to the cross over connection, the magnetic induction vectors are 180 degrees out of phase. As a result, the net magnetic induction vector goes to zero when viewed from the prospective of the vehicle coil and no net thrust is generated. However, when the loops are longitudinally offset, the magnetic induction vectors are no longer 180 degrees out of phase; this produces a net magnetic induction vector oriented at a particular phase angle depending on the amount of longitudinal offset. The presence of a net magnetic induction vector coupled with the vehicle coil introduces a net thrust vector to the vehicle. This longitudinal displacement 13 also somewhat modifies the "null-flux" suspension concept in that it introduces a vertical force component of alternating sign even when the vehicle coil 10 is in the "null-flux" position 16, symmetrical about the "FIG. 8" horizontal midplane. When the vehicle coil 10 is displaced downward to the point where the magnetic force is sufficient to counteract the force of gravity on the vehicle, the longitudinal displacement 13 of the loops adds a small position dependent force component onto the main suspension force. The main suspension force also varies with position due to the fact that discrete coils are used. The time averaged vertical force is little changed by the longitudinal offset.

Figure 3:
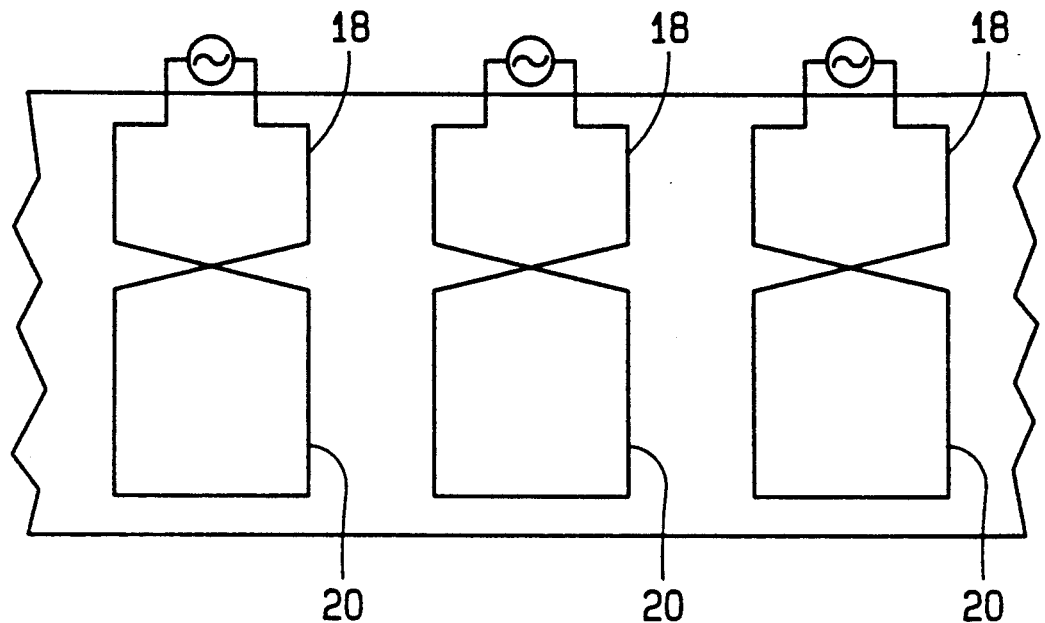
FIG. 3 is a schematic of a section of guideway wall with vertically mounted FIG. 8 coils where the lower loop of each coil has a larger enclosed area than the upper loop.
Figure 8:
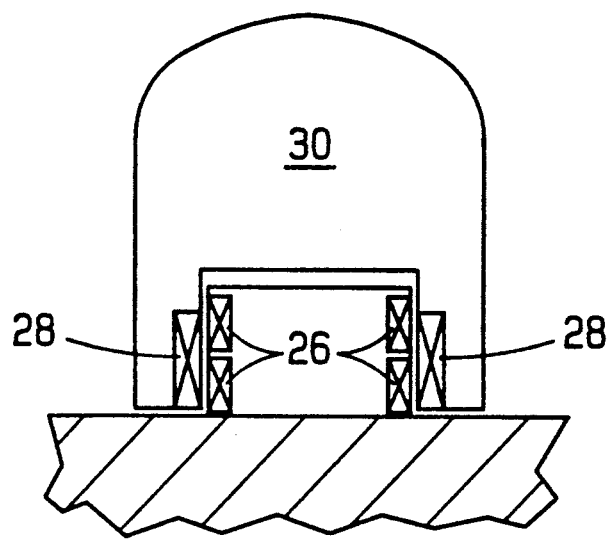
FIG. 8 shows a cross section of the vehicle/guideway in the at grade configuration with a box beam shaped guideway.

Another method of eliminating the zero thrust condition, when the vehicle is located at the "FIG. 8" midplane 16, is to reduce the size of the upper loop 18, FIG. 3 relative to the lower loop 20, FIG. 3. By reducing the size of one of the FIG. 8 loops with respect to the other, the magnitude of magnetic induction vector of one loop is greater than that of the other producing a net magnetic induction vector. As a result, the magnetic interaction of the FIG. 8 coil interacts with the vehicle coil producing a net thrust. Thus, varying the size of one of the FIG. 8 loops with respect to the other results in a magnetic interaction between the FIG. 8 coil and the vehicle coil producing a net thrust on the vehicle.

Figure 4:
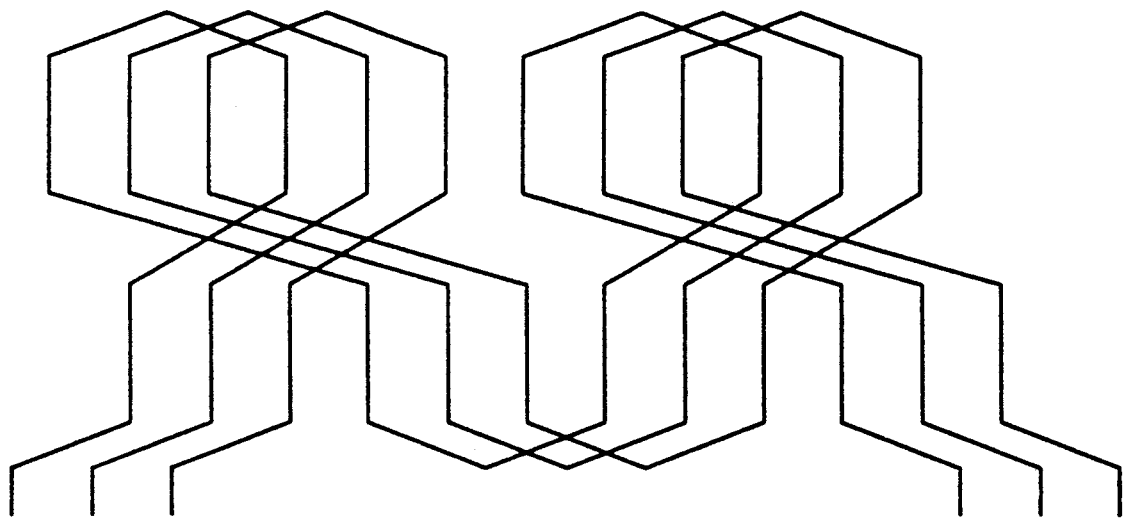
FIG. 4 illustrates a typical winding for a 3-phase excited set of guideway mounted FIG. 8 coils with a longitudinal offset.

A typical 3-phase winding pattern is shown in FIG. 4. Any number of turns may be used per coil. It is not necessary that the coils physically overlap each other. They may be spatially separated.

This invention also uses a vertical separation distance, $\Delta y$ 22, FIG. 1, between the upper and lower loops of the "FIG. 8" coils 12 to partially control the stable range of the vertical suspension and the suspension stiffness. The larger the value of $\Delta y$ 22 used, the larger the range of vertical travel over which the vertical suspension remains stable and the less the stiffness. The stable range is that range of deviation from the midplane 16 of the "FIG. 8" coils over which the restoring force increases with the deviation.

Figure 5:
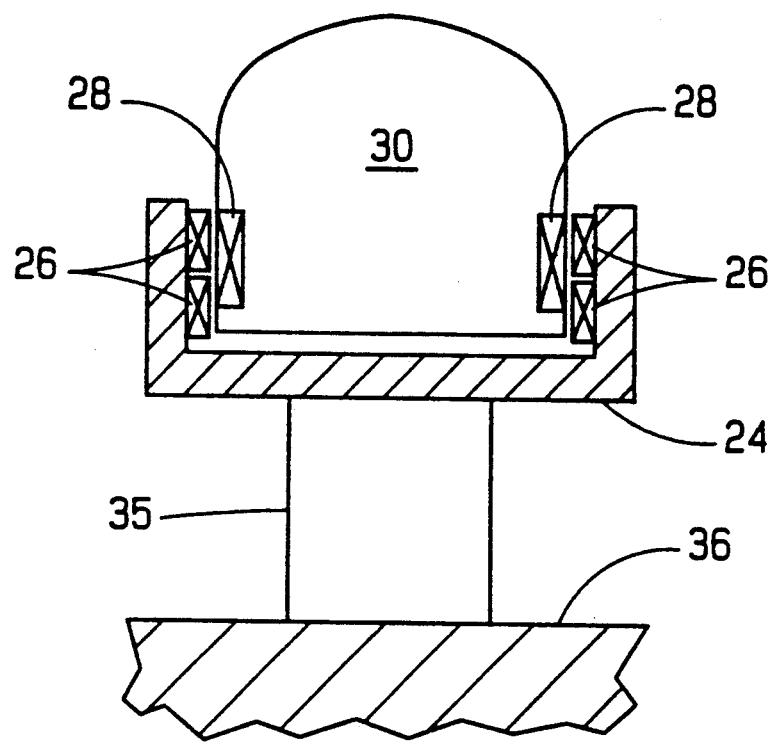
FIG. 5 shows a cross section of the vehicle/guideway in the elevated configuration with a "U-shaped" guideway.
Figure 6:
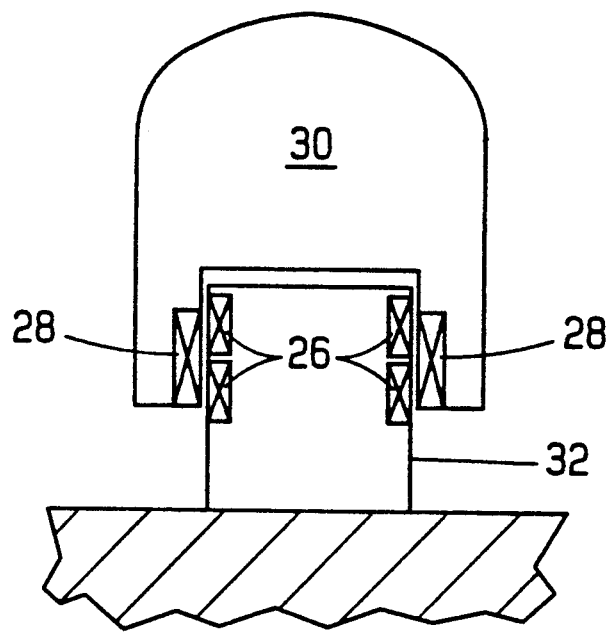
FIG. 6 shows a cross section of a vehicle/guideway in the elevated configuration with a box beam shaped guideway.
Figure 7:
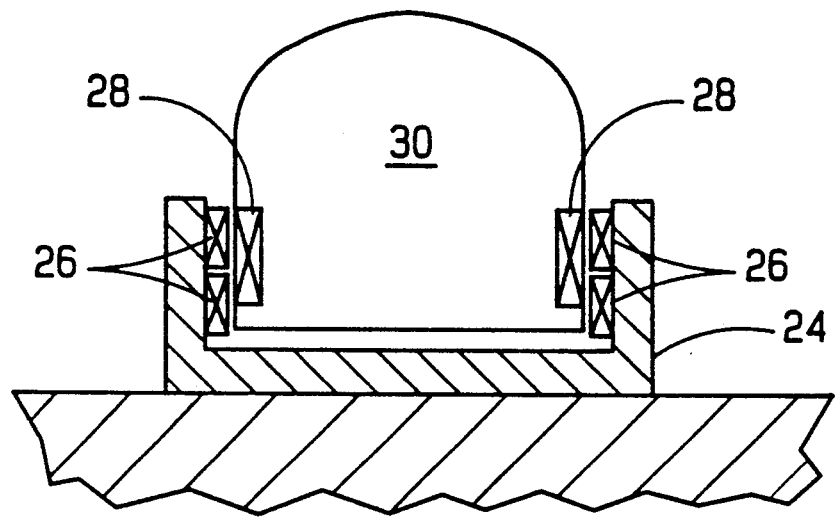
FIG. 7 shows a cross section of the vehicle/guideway in the at grade configuration with a "U-shaped" guideway.

Two vehicle/guideway configurations are envisioned. In the first, FIG. 5, a "U-shaped" guideway 24 is envisioned with the multiphase "FIG. 8" coils 26 mounted ont he inside surfaces of the vertical walls and the SCM's 28 mounted on or near the outside of the lower part of the vehicle 30. The guideway 24, in this embodiment, is mounted on pillars 35 imbedded in roadbed 36. While in the second, FIG. 6, a box beam shaped guideway 32 is straddled by the vehicle so that the "FIG. 8" coils 26 are mounted on the outer surfaces of the walls of the box beam 32 and the SCM's 28 are mounted on the inside vertical surfaces of the vehicle undercarriage. In either configuration, the guideways may be elevated on pillars or mounted at grade. Further, for either configuration, the SCM's 28 may be attached to the vehicle body 30 by a secondary suspension system consisting of some combination of active and/or passive vibration control devices of a mechanical and/or electromechanical nature, such as, springs, shock absorbers, dampers, controlled-current magnets or eddy-current damping plates (not shown), to produce the desired ride quality. Lateral guidance for the vehicle is provided automatically by the repulsive forces, the force components normal to the "FIG. 8" coil plane, between the fields of the vehicle SCM's 28 and the magnetic fields set up in the "FIG. 8" coils 26 by eddy currents induced in them by the moving SCM's. The closer the SCM's 28 are to the FIG. 8 coils 26 the stronger the repulsive forces. No cross connection of the "FIG. 8" coils mounted on opposite walls of the guideway is required for lateral guidance.

In this invention, a set of "FIG. 8" coils are used to provide a form of null-flux suspension, lateral guidance, and propulsion. An external source of three-phase power, FIG. 1, 34 provides the propulsion forces. FIG. 1 is the usual "FIG. 8" winding with zero thrust when the vehicle is in the neutral position between loops. However under the influence of gravity, the vehicle will move to a lower position until gravity and the magnetic suspension forces are balanced. This change in position will produce a resultant thrust or propulsion. FIG. 2 depicts the lower coil being longitudinally offset which will provide thrust even when the vehicle coil is in the neutral position between the loops of the "FIG. 8". FIG. 3 illustrates the condition where the upper loop is smaller than the lower loop. This will also provide propulsion when the vehicle is in the neutral position. Accordingly, both modifications in the "FIG. 8" loop arrangement provides propulsion when the vehicle coil is in the neutral or non-neutral positions. An increase in the separation of the loops 22 acts to reduce stiffness in the ride. As a result, to achieve optimal system performance, the entire route of the maglev vehicle is designed to include variations in loop size, configuration and separation.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A magnetic leviation and propulsion system for a vehicle adapted to travel over an elevated or at grade guideway support structure and having a specified direction of motion comprising:
   a guideway attached to the support structure where said guideway has two parallel surfaces where said surfaces are oriented along the direction of motion;
   a plurality of conductive coils attached to said parallel surfaces of said guideway where said coils aer shaped like a figure eight producing an upper loop and a lower loop where said upper and lower loops are electrically connected and wound in opposing directions, where said upper loop is longitudinally displaced from said lower loop, and where said coils are energized by an external multiphase electrical power source to produce an associated traveling magnetic wave;
   a plurality of superconducting magnets attached to the vehicle and mounted in a plane parallel to said conductive coils to produce a magnetic field which interacts with a field produced by said conductive coils to produce a null-flux suspension and lateral guidance and which interacts with said traveling magnetic wave to produce vehicle propulsion.

2. The system of claim 1 where said external power source provides three phase power to provide for propulsion of the vehicle.

3. The system of claim 1 where said conductive coils automatically provide lateral guidance and where said coils are not cross connected to opposing conductive coils by means of cross connections.

4. The system of claim 3 where said upper loop and said lower loop are vertically, displaced from each other to partially control vehicle suspension stiffness and vehicle vertical suspension stability.

5. The system of claim 1 where said guideway has a U-shape and where the vehicle travels between spaced parallel walls of said U-shaped guideway.

6. The system of claim 1 where said vehicle has a U-shaped base, where said guideway has a box-beam shape and where said box-beam guideway is positioned between spaced parallel walls of said U-shaped vehicle base.

7. A magnetic leviation and propulsion system for a vehicle adapted to travel over an elevated or at grade guideway support structure and having a specified direction of motion comprising:
   a guideway attached to the support structure where said guideway has two parallel surfaces where said surfaces are oriented along the direction of motion;
   a plurality of conductive coils attached to said parallel surfaces of said guideway where each coil of said plurality of coils is shaped like a figure eight producing an upper loop and a lower loop where said upper and lower loops are electrically connected and wound in opposing directions, where said upper loop differs in diameter from said lower loop, and where said coils are energized by an external multiphase electrical power source to produce an associated traveling magnetic wave;
   a plurality of superconducting magnets attached to the vehicle and mounted in a plane parallel to said conductive coils to produce a magnetic field which interacts with a field produced by said conductive coils to produce a null-flux suspension and lateral guidance and which interacts with said traveling magnetic wave to produce vehicle propulsion.

8. The system of claim 7 where said external power source provides three phase power to provide for propulsion of the vehicle.

9. The system of claim 7 where said conductive coils automatically provide lateral guidance and where said coils are not cross connected to opposing conductive coils by means of cross connections.

10. The system of claim 7 where said guideway has a U-shape and where the vehicle travels between spaced parallel walls of said U-shaped guideway.

11. The system of claim 7 where said vehicle has a U-shaped base, where said guideway has a box-beam shape and where said box-beam guideway is positioned between spaced parallel walls of said U-shaped vehicle base.

* * * * *